United States Patent
McCaffrey

(10) Patent No.: US 10,189,219 B2
(45) Date of Patent: Jan. 29, 2019

(54) METHOD OF FABRICATING A CERAMIC ARTICLE

(71) Applicant: United Technologies Corporation, Hartford, CT (US)

(72) Inventor: Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 329 days.

(21) Appl. No.: 15/026,023

(22) PCT Filed: Sep. 29, 2014

(86) PCT No.: PCT/US2014/057966
§ 371 (c)(1),
(2) Date: Mar. 30, 2016

(87) PCT Pub. No.: WO2015/050801
PCT Pub. Date: Apr. 9, 2015

(65) Prior Publication Data
US 2016/0236427 A1  Aug. 18, 2016

Related U.S. Application Data

(60) Provisional application No. 61/886,767, filed on Oct. 4, 2013.

(51) Int. Cl.
*B29C 70/42* (2006.01)
*C04B 41/82* (2006.01)
(Continued)

(52) U.S. Cl.
CPC ............ *B29C 73/025* (2013.01); *B29C 45/14* (2013.01); *B29C 70/06* (2013.01); *B29C 70/42* (2013.01);
(Continued)

(58) Field of Classification Search
CPC ....... B29C 70/40–70/446; B29C 45/14; C04B 41/82; C04B 41/84; B28B 21/94
See application file for complete search history.

(56) References Cited

U.S. PATENT DOCUMENTS 4,942,013 A * 7/1990 Palmer ................ B29C 43/3642
156/285
4,969,972 A    11/1990 Kunz
(Continued)

FOREIGN PATENT DOCUMENTS

JP   H08-10377    1/1996
JP   2012-158037  8/2012

OTHER PUBLICATIONS

International Search Report and Written Opinion for International Application No. PCT/US2014/057966 dated Jan. 9. 2015.
(Continued)

*Primary Examiner* — Erin Snelting
(74) *Attorney, Agent, or Firm* — Carlson, Gaskey & Olds, P.C.

(57) ABSTRACT

A disclosed resin transfer molding process includes inserting a ceramic article within a bladder defining a part cavity, inserting the bladder including the ceramic article into a second cavity with a fixed geometry, and pressurizing the bladder against the ceramic article. The method further includes injecting resin into the ceramic article within the bladder with the bladder against the ceramic article to maintain resin within the ceramic article during curing.

17 Claims, 2 Drawing Sheets

(51) Int. Cl.
- *B29C 73/02* (2006.01)
- *B29C 70/48* (2006.01)
- *B29C 45/14* (2006.01)
- *B29C 70/06* (2006.01)
- *C04B 35/64* (2006.01)
- *C04B 41/83* (2006.01)
- *B29K 309/02* (2006.01)
- *B29K 105/08* (2006.01)
- *B29K 105/00* (2006.01)

(52) U.S. Cl.
CPC .............. *B29C 70/48* (2013.01); *C04B 35/64* (2013.01); *C04B 41/83* (2013.01); *B29K 2105/0872* (2013.01); *B29K 2105/253* (2013.01); *B29K 2309/02* (2013.01); *B29K 2883/00* (2013.01)

(56) References Cited

U.S. PATENT DOCUMENTS

| | | | |
|---|---|---|---|
| 5,116,216 A * | 5/1992 | Cochran | B29C 70/44 156/286 |
| 5,236,646 A * | 8/1993 | Cochran | B29C 70/44 156/286 |
| 5,441,692 A | 8/1995 | Taricco | |
| 5,882,575 A | 3/1999 | Atmur et al. | |
| 5,921,754 A | 7/1999 | Freitas et al. | |
| 6,482,497 B1 | 11/2002 | Kay et al. | |
| 6,508,974 B1 * | 1/2003 | Loving | B29C 70/443 264/510 |
| 8,318,067 B2 | 11/2012 | Northfield et al. | |
| 8,480,393 B2 | 6/2013 | Obermeyer et al. | |
| 8,470,404 B2 | 7/2013 | Miller et al. | |
| 2001/0003402 A1 | 6/2001 | Isono et al. | |
| 2002/0022422 A1 * | 2/2002 | Waldrop, III | B29C 70/443 442/179 |
| 2005/0086916 A1 * | 4/2005 | Caron | B29C 43/12 55/382 |
| 2005/0276961 A1 | 12/2005 | Sherwood et al. | |
| 2007/0194475 A1 * | 8/2007 | Wilenski | B29C 70/44 264/40.6 |
| 2009/0252921 A1 * | 10/2009 | Bottler | B29C 70/086 428/116 |
| 2010/0098927 A1 * | 4/2010 | Boyd | B29C 70/44 428/220 |
| 2010/0181018 A1 * | 7/2010 | Walczyk | B29C 70/44 156/243 |
| 2011/0003163 A1 | 1/2011 | Wood | |
| 2011/0268577 A1 | 11/2011 | Bouillon et al. | |
| 2012/0175824 A1 * | 7/2012 | Fergusson | B29C 43/3642 264/571 |
| 2012/0201980 A1 | 8/2012 | Stout et al. | |
| 2012/0305169 A1 * | 12/2012 | Hanks | B29C 70/443 156/98 |
| 2013/0122763 A1 | 5/2013 | Fish et al. | |
| 2014/0083609 A1 * | 3/2014 | Driver | B29C 70/44 156/285 |
| 2014/0147688 A1 * | 5/2014 | Corral | B29C 70/443 428/519 |
| 2014/0161922 A1 * | 6/2014 | Thompson | B29C 35/0227 425/405.2 |
| 2014/0327187 A1 * | 11/2014 | Hurdle | B29C 70/44 264/443 |
| 2015/0246718 A1 * | 9/2015 | Aitken | B64C 1/26 29/897.2 |
| 2016/0031164 A1 * | 2/2016 | Downs | B29C 70/542 428/12 |

OTHER PUBLICATIONS

International Preliminary Report on Patentability for International Application No. PCT/US2014/057966 dated Apr. 14, 2016.

European Search Report for EP Application No. 14851299.9 dated May 22, 2017.

* cited by examiner

METHOD OF FABRICATING A CERAMIC ARTICLE

REFERENCE TO RELATED APPLICATION

This application claims priority to U.S. Provisional Application No. 61/886,767 filed on Oct. 4, 2013.

BACKGROUND

A resin transfer molding process begins with a fibrous pre-form that is inserted into a rigid mold die piece mold. In the mold, resin is injected at a low temperature into the pre-mold and cured. The curing process changes the resin into a pre-ceramic polymer material. The pre-ceramic polymer material is rigid and allows the part to be removed from the mold tool and pyrolized at very high temperatures. The pyrolized process at high temperature is conducted outside of the tool and converts the pre-ceramic polymer into a ceramic material. During the pyrolysis operation, a significant amount of polymer shrinkage occurs as it is converted into a ceramic material. The significant amount of shrinkage causes porosity including pores and cracks formed within the ceramic matrix.

After the first pyrolysis process, additional polymer infiltration processes are utilized to fill the pores and cracks that exist in the ceramic matrix from the first process. Additional cycles of the polymer infiltration and pyrolysis process are executed to increase the density and reduce the porosity within the part. However, each high temperature pyrolysis process causes distortion of the part and prevents the part from being reinserted into the original rigid tool utilized to inject resin into the pre-form. Accordingly, the current practice is to simply dip a part into resin, remove from the resin, and pyrolize outside of a rigid tool. However, such processes do not retain sufficient amount of liquid resin within the cores, voids and cracks of the ceramic part to adequately fill and provide the desired density of the completed part. Moreover, such a process often results in significant amounts of pre-ceramic polymer on outer surfaces of the ceramic part that must be machined or otherwise removed prior to the next pyrolysis operation.

Accordingly, it is desirable to develop a re-infiltration process to inject resin into a ceramic part to fill voids that minimizes the use of excess resin and provides for the more efficient infusion of resin into the cracks and voids formed within the part.

SUMMARY

A resin transfer molding process according to an exemplary embodiment of this disclosure, among other possible things includes inserting a ceramic article within a bladder defining a part cavity, inserting the bladder into a second cavity with a fixed geometry, pressurizing the bladder against the ceramic article, and injecting resin into the ceramic article within the bladder with the bladder against the ceramic article to maintain resin within the ceramic article during curing.

In a further embodiment of the foregoing, the resin transfer molding process includes applying a vacuum within the bladder to the ceramic article for drawing resin into the ceramic article.

In a further embodiment of any of the foregoing, pressure within the bladder is cycled between a high pressure and a lower pressure to induce resin flow into the ceramic article.

In a further embodiment of any of the foregoing, the resin transfer molding process includes a curing the resin injected into the ceramic article into a rigid pre-ceramic polymer.

In a further embodiment of any of the foregoing, the resin transfer molding process includes cooling the bladder and ceramic article to room temperature and removing the bladder and ceramic article from the second cavity.

In a further embodiment of any of the foregoing, the resin transfer molding process includes removing the bladder from the ceramic article.

In a further embodiment of any of the foregoing, the resin transfer molding process includes heating the ceramic article once removed from the second cavity to a temperature determined to pyrolize the pre-ceramic polymer.

In a further embodiment of any of the foregoing, the resin transfer molding process includes re-inserting the ceramic article into the bladder and the second cavity, injecting additional resin, curing to form pre-ceramic polymer within the ceramic part and heating to pyrolize the pre-ceramic polymer to obtain a desired porosity of a completed ceramic article.

A method of forming a ceramic article according to an exemplary embodiment of this disclosure, among other possible things includes forming a ceramic article of a first porosity from a pre-mold within a first cavity, inserting the ceramic article into a bladder defining a part cavity, inserting the bladder into a second cavity within a second mold, pressurizing the bladder around the ceramic article, injecting resin into the ceramic article within the bladder and second cavity, curing the ceramic article within the bladder to form pre-ceramic polymer within voids within the ceramic article, removing the ceramic article from the second cavity, heating the ceramic article to pyrolize the pre-ceramic polymers formed within existing voids of the ceramic article to form a ceramic article of a second porosity, re-inserting the ceramic article into the bladder and the second cavity, injecting additional resin, curing to form pre-ceramic polymer within voids of the ceramic part and heating to pyrolize the pre-ceramic polymer to obtain a desired final porosity of the ceramic article.

In a further embodiment of the foregoing, the method of forming a ceramic article of the first porosity includes inserting a pre-mold into a first cavity within a first mold, injecting resin into the pre-mold within the first cavity, curing the pre-mold to form a pre-ceramic polymer, removing the pre-mold from the first cavity and heating the pre-mold including the pre-ceramic polymer to form a ceramic article including a first porosity.

In a further embodiment of any of the foregoing, the method of forming a ceramic article includes applying a vacuum within the bladder to the ceramic article for drawing resin into the ceramic article.

In a further embodiment of any of the foregoing, pressure within the bladder is cycled between a high pressure and a lower pressure to induce resin flow into the ceramic article.

In a further embodiment of any of the foregoing, the method of forming a ceramic article includes cooling the bladder and ceramic article to room temperature and removing the bladder and ceramic article from the second cavity.

In a further embodiment of any of the foregoing, the method of forming a ceramic article includes removing the bladder from the ceramic article.

In a further embodiment of any of the foregoing, the method of forming a ceramic article includes heating the ceramic article once removed from the second cavity to a temperature determined to pyrolize the pre-ceramic polymer.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
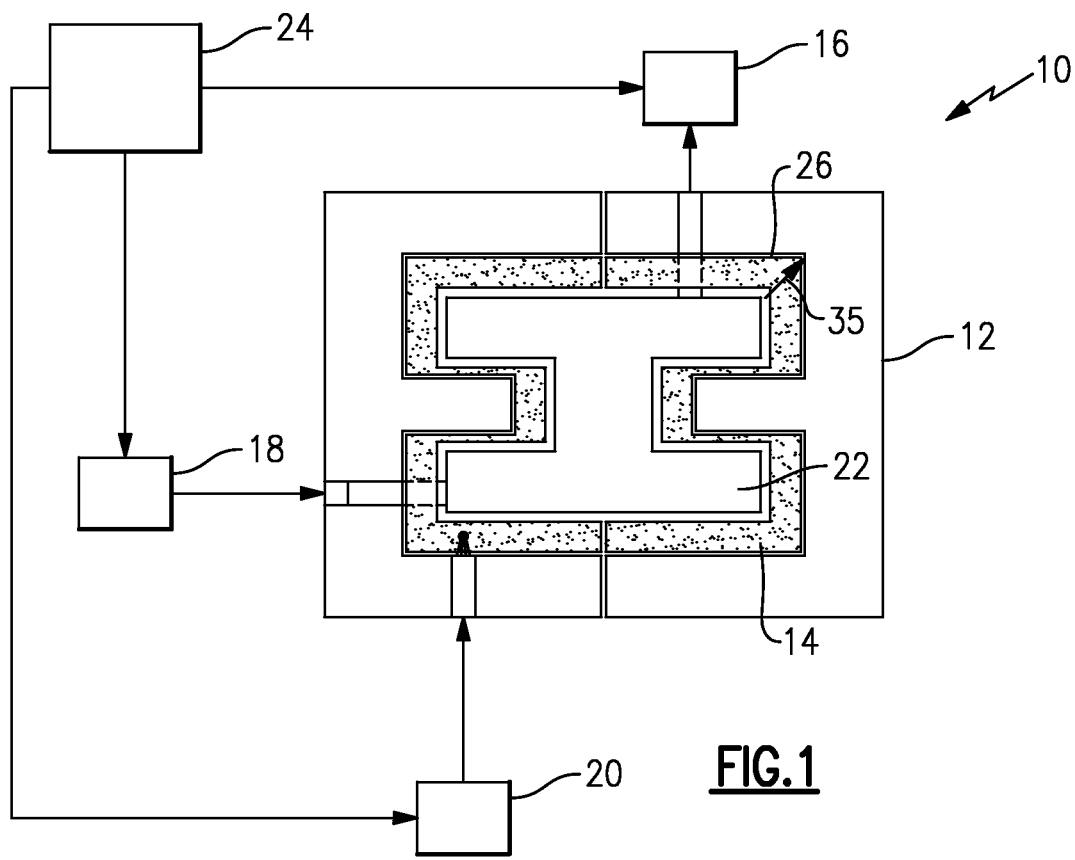
FIG. 1 is a schematic view of an example flexible resin transfer molding tool.

Referring to FIG. 1, an example resin transfer molding tool for polymer infiltration and pyrolysis operation includes a mold 12 that defines an internal cavity 26 that receives a ceramic article 22 that is enclosed within an inflatable bladder 14. The inflatable bladder 14 fills gaps 35 between the outer geometry and shape of the ceramic article 22 and the part cavity 26 defined by the mold 12.

The mold 12 includes conduits that communicate resin as is indicated schematically at 16 and that provide a vacuum into the part cavity 26 to remove air to allow for the better infusion of resin into the ceramic article 22. The example tool 10 also includes a pumping device 20 that fills the bladder 14 to provide the desired pressure against the exterior surfaces of the ceramic article 22 and provide the pressure infusion of resin 18. A controller 24 is provided to control the resin impregnation 18, filling of the bladder by the pump 20, and the vacuum source 16.

Figure 2:
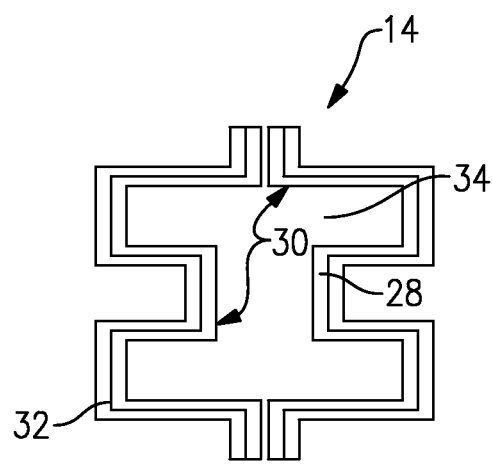
FIG. 2 is a schematic view of an example bladder for the disclosed resin transfer and polymer infiltration process.

Referring to FIG. 2 with continued reference to FIG. 1, an example bladder 14 is illustrated and defines an internal part cavity 34 that receives the ceramic article 22. The bladder 14 includes an internal cavity 28 that is fillable with a liquid such as a pre-ceramic resin utilized to exert a pressure force on the external surfaces of the ceramic article 22. The internal cavity 34 includes internal surfaces 30 that engage the exterior surfaces of a ceramic article 22. The bladder 14 also may include a reinforcement structure 32 to define a general overall shape that corresponds with the desired ceramic article geometry.

The bladder 14 is configured to receive liquid materials, such as a pre-ceramic resin, communicated by the pump 20. Pre-ceramic resin is utilized to fill the bladder and apply pressure against the ceramic article 22 to hold resin 18 within the ceramic article 22. The bladder 14 conforms to the ceramic article 22 to enable use of a common tool 12 while accommodating part to part variation caused by the various heat treating processes executed during fabrication of the ceramic article 22. In this example, the bladder 14 is made from a silicon rubber or similar flexible material that is compatible with the temperatures required for the low temperature curing conducted within the mold tool 12.

In traditional resin transfer molding operations, the ceramic article is formed within a first mold by infusing resin into a fiber pre-mold. Once the fiber pre-mold is impregnated with the desired amount of resin, it is cured for a predetermined time to form a pre-ceramic polymer. Curing within the first mold occurs at a relatively low temperature of between 100° C. and 200° C. The pre-ceramic polymer soaked pre-form is then completed in during a pyrolysis operation where the pre-ceramic polymer is treated at very high temperatures to transform the pre-ceramic polymer to a ceramic material. The temperatures are typically between 850° C. and 1800° C. The high temperatures encountered during the pyrolysis operation can distort the resulting ceramic article. Distortions of the ceramic article are not typically uniform or substantially repeatable and therefore prevent the reuse and reinsertion of the pyrolized ceramic article into the original mold tool. This is because the original tool is a rigid structure and cannot accommodate the variations in geometry that occur during processing between various ceramic articles.

Moreover, after the pyrolysis operation, substantial voids and porosity may be encountered within the initial ceramic article. The repeated polymer infiltration and pyrolysis operations typically utilized to increase the density and reduce the porosity of a ceramic article only increase the deformation of the ceramic part. Moreover, the polymer infusion and pyrolysis process can be inefficient because a substantial amount of the liquid resin is not capable of being maintained within the ceramic article during the pyrolysis operation.

The example device and method utilizes the fluid filled bladder 14 to accommodate and fill gaps 35 between the ceramic article 22 and the internal surfaces of the mold tool 12 to allow for reinsertion of a pyrolized ceramic article back into an example second mold tool 12. The bladder 14 is filled with a liquid material that can be utilized to exert a desired pressure against the surfaces of the ceramic article 22 to maintain the resin within the voids, cracks and other openings within the ceramic article 22 during an initial curing process. The bladder 14 maintains a pressure against surfaces of the ceramic article 22 until completion of the curing process. Because a substantial amount of the resin can be maintained within the ceramic article 22 that is encased within the fillable bladder 14, the number of repeated cycles required to obtain a ceramic article 22 of a desired density can be substantially improved.

Figure 3:
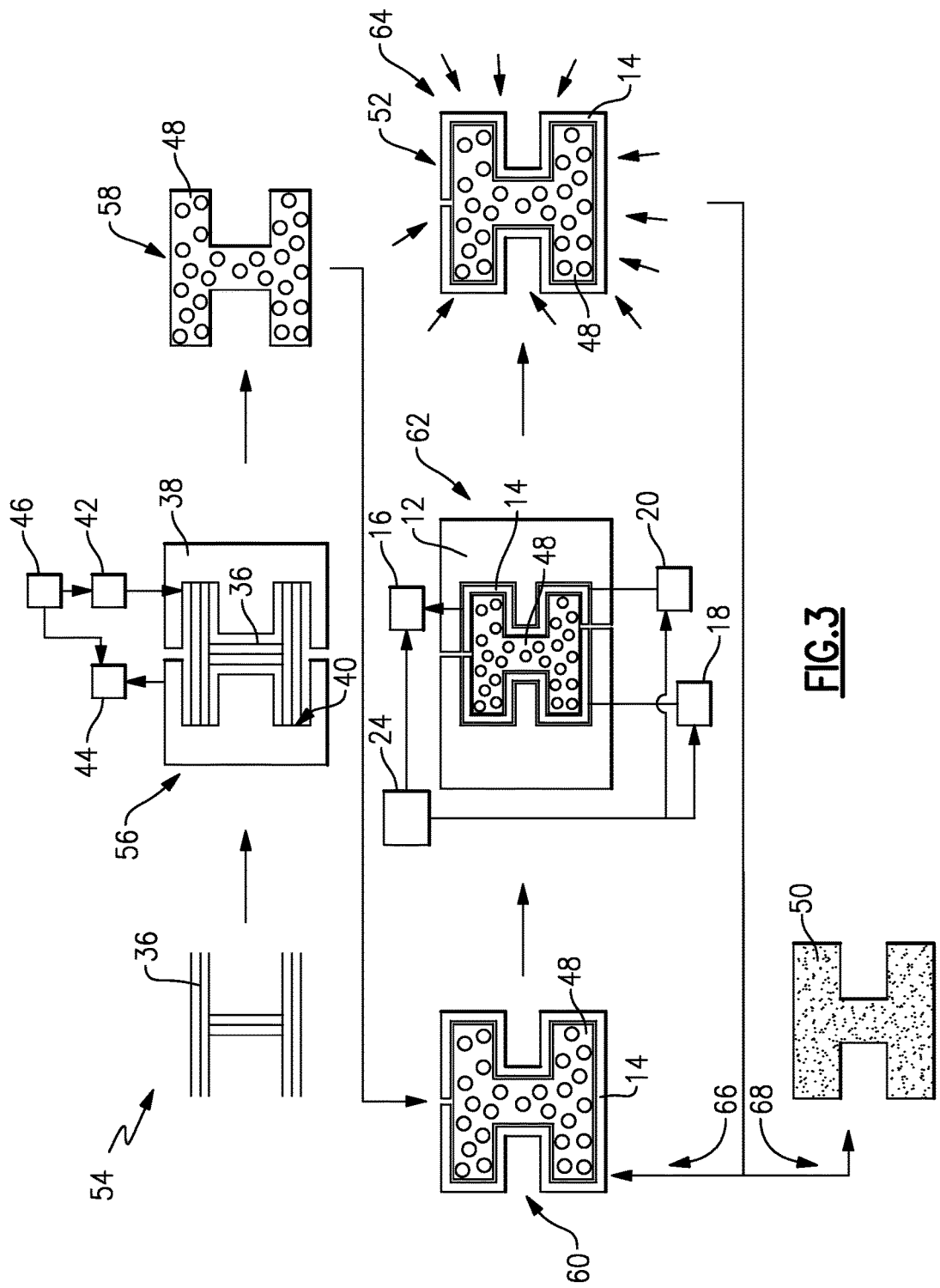
FIG. 3 is a schematic representation of a disclosed method of resin transfer molding and polymer infiltration and pyrolysis to form a ceramic article.

Referring to FIG. 3 with continued reference to FIG. 1, the example method 54 begins with a fiber pre-form 36 inserted into a first mold 38. The first mold 38 includes a cavity 40 that defines a desired initial geometry and shape of a completed ceramic article. The first mold 38 includes a vacuum source 44 and a resin injection device 42 that is controlled by a controller 46. As appreciated, although a vacuum source 44 is disclosed; other processes that do not utilize a vacuum are within the contemplation of this disclosure for the initial resin impregnation of the pre-form 36.

Within the first mold 38, as is indicated schematically at 56, resin is impregnated into the pre-form 36 and allowed to cure to form the pre-ceramic polymer. The pre-ceramic polymer impregnated pre-form 36 is then removed from the first mold 38. Subsequently the pre-ceramic polymer impregnated preform, 36, is processed at elevated temperatures 58, into a ceramic article 48.

The ceramic article 48 is then installed into the bladder 14 as is indicated at step 60. The bladder 14 and ceramic article 48 are then inserted into the second mold 12 that includes an inner cavity 26 that is larger than the cavity 40 of the first mold. The larger inner cavity 26 provided by the second mold 12 accommodates the bladder 14 along with variations in the ceramic article 48. The bladder 14 is fillable to fill any gaps 35 that may exist between the internal surfaces of the cavity 26 defined by the mold tool 12 and the ceramic article 22.

Once the bladder 14 and ceramic article 48 are inserted into the second mold 12, a resin impregnation process is executed where resin from a resin source 18 is injected into the ceramic article 48 under pressure. A vacuum may be applied to the ceramic article 48 from the vacuum source 16 to draw resin into the ceramic part 48 and fill any cracks and voids that may exist within the initial ceramic article 48.

The bladder 14 is filled with a fluid that is compatible with the temperatures incurred during the resin impregnation process. In one example, the bladder 14 is filled with resin to exert pressure on the external surfaces of the ceramic article 22 to force and hold resin into the cracks and voids. The resin may be pumped into the bladder 14 at an increasing pressure until a desired static pressure is obtained and maintained at that desired static pressure.

In another example, resin is pumped into the bladder 14 in a cyclical manner to provide a pumping action that further infuses resin into cracks, openings and voids in external surfaces of the ceramic article 48. The cyclical pressure exerted by the pump 20 and, thereby, on the surfaces of the bladder 14 on the external surfaces of the ceramic article 48 aid in resin flow through the part with or without the aid of the vacuum applied by the vacuum source 16. The cyclical pumping action provided by the bladder 14 can provide significant improvements in resin impregnation during the initial load temperature curing process executed as schematically indicated at 62 within the second mold 12. Pressure exerted by the bladder 14 is maintained until the resin is cured.

Once this initial and subsequent resin impregnation and pre-ceramic polymer conversion process is complete, the ceramic article 48 and bladder 14 are removed from the second mold 12. Upon removal of the ceramic article 48, the resin that had been subsequently injected into the voids and cracks, and converted into pre-ceramic polymer, requires pyrolization to be converted into the desired ceramic material. The pyrolysis process as generally indicated at 64 includes high temperature heat treatment of the ceramic article 48 as is known in the art. In this example, the heat treatment process 64 exerts a heat indicated schematically by arrows 52 on to the ceramic article 48. The heat treatment process indicated at 64 can be conducted with the bladder 14 remaining on the part, such that the bladder 14 will encounter the extreme heat and be destroyed such that it may be removed after the pyrolysis process.

The bladder 14 may also be removed prior to the pyrolysis operation and reused. The bladder 14 is removed from the ceramic article 48 prior to the pyrolysis operation, such that it may be reused for this part or another ceramic article in subsequent resin injection processes as are schematically shown at 62. A vacuum may be applied to the bladder 14 to aid in removal from the ceramic article 48.

In another example, the bladder 14 is destroyed during the heat treatment or pyrolysis process and a second or subsequent bladder is utilized for subsequent processes.

Once the pyrolysis process 64 is complete, the part may undergo a repeated pyrolysis operation as is indicated at 66 to repeat the resin injection in the second mold 12 with a bladder 14 to infuse resin into any remaining cracks, voids and pores. The process can be repeated as is indicated at 66 until a ceramic article of a desired density and porosity is achieved as is indicated at 68 to achieve a completed ceramic article 50.

Accordingly, the example device and method allows resin injection pressures and vacuum that is in excess of atmospheric pressures to fill the deep voids, pores and cracks within a ceramic article after an initial resin injection and pyrolysis process.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A resin transfer molding process comprising:
   inserting a ceramic article within a bladder defining a part cavity;
   inserting the bladder into a second cavity with a fixed geometry;
   pressurizing the bladder against the ceramic article by filling the bladder with a liquid material; and
   injecting resin into the ceramic article within the bladder with the bladder against the ceramic article to maintain resin within the ceramic article during curing.

2. The resin transfer molding process as recited in claim 1, including applying a vacuum within the bladder to the ceramic article for drawing resin into the ceramic article.

3. The resin transfer molding process as recited in claim 1, wherein pressure within the bladder is cycled between a high pressure and a lower pressure to induce resin flow into the ceramic article.

4. The resin transfer molding process as recited in claim 1, including-a curing the resin injected into the ceramic article into a rigid pre-ceramic polymer.

5. The resin transfer molding process as recited in claim 4, including cooling the bladder and ceramic article to room temperature and removing the bladder and ceramic article from the second cavity.

6. The resin transfer molding process as recited in claim 5, including removing the bladder from the ceramic article.

7. The resin transfer molding process as recited in claim 5, including heating the ceramic article once removed from the second cavity to a temperature determined to pyrolize the pre-ceramic polymer.

8. The resin transfer molding process as recited in claim 7, including re-inserting the ceramic article into the bladder and the second cavity, injecting additional resin, curing to form pre-ceramic polymer within the ceramic part and heating to pyrolize the pre-ceramic polymer to obtain a desired porosity of a completed ceramic article.

9. The resin transfer molding process as recited in claim 1, wherein the liquid material comprises a pre-ceramic resin.

10. A method of forming a ceramic article comprising:
    forming a ceramic article of a first porosity from a pre-mold within a first cavity;
    inserting the ceramic article into a bladder defining a part cavity;
    inserting the bladder into a second cavity within a second mold;
    pressurizing the bladder around the ceramic article by filling the bladder with a liquid material;
    injecting resin into the ceramic article within the bladder and second cavity;
    curing the ceramic article within the bladder to form pre-ceramic polymer within voids within the ceramic article;
    removing the ceramic article from the second cavity;

heating the ceramic article to pyrolize the pre-ceramic polymers formed within existing voids of the ceramic article to form a ceramic article of a second porosity; and re-inserting the ceramic article into the bladder and the second cavity, injecting additional resin, curing to form pre-ceramic polymer within voids of the ceramic part and heating to pyrolize the pre-ceramic polymer to obtain a desired final porosity of the ceramic article.

11. The method of forming a ceramic article as recited in claim 10, wherein forming the ceramic article of the first porosity includes inserting a pre-mold into a first cavity within a first mold, injecting resin into the pre-mold within the first cavity, curing the pre-mold to form a pre-ceramic polymer, removing the pre-mold from the first cavity and heating the pre-mold including the pre-ceramic polymer to form a ceramic article including a first porosity.

12. The method of forming a ceramic article as recited in claim 10, including applying a vacuum within the bladder to the ceramic article for drawing resin into the ceramic article.

13. The method of forming a ceramic article as recited in claim 10, wherein pressure within the bladder is cycled between a high pressure and a lower pressure to induce resin flow into the ceramic article.

14. The method of forming a ceramic article as recited in claim 10, including cooling the bladder and ceramic article to room temperature and removing the bladder and ceramic article from the second cavity.

15. The method of forming a ceramic article as recited in claim 14, including removing the bladder from the ceramic article.

16. The method of forming a ceramic article as recited in claim 15, including heating the ceramic article once removed from the second cavity to a temperature determined to pyrolize the pre-ceramic polymer.

17. The method of forming a ceramic article as recited in claim 10, wherein the liquid material comprises a pre-ceramic resin.

* * * * *